US008620375B2

(12) United States Patent
Kim et al.

(10) Patent No.: US 8,620,375 B2
(45) Date of Patent: Dec. 31, 2013

(54) METHOD AND APPARATUS FOR SUPPORTING DISCONTINUOUS OPERATION OF BASE STATION IN WIRELESS COMMUNICATION SYSTEM AND CONTROL SYSTEM THEREOF

(75) Inventors: Tae-Joong Kim, Gyeonggi-do (KR); Kwang-Chun Lee, Daejeon (KR); Jae-Heung Kim, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 291 days.

(21) Appl. No.: 13/254,772

(22) PCT Filed: Mar. 2, 2010

(86) PCT No.: PCT/KR2010/001297
§ 371 (c)(1),
(2), (4) Date: Sep. 2, 2011

(87) PCT Pub. No.: WO2010/101391
PCT Pub. Date: Sep. 10, 2010

(65) Prior Publication Data
US 2011/0312370 A1 Dec. 22, 2011

(30) Foreign Application Priority Data

Mar. 2, 2009 (KR) .................. 10-2009-0017740
Mar. 2, 2010 (KR) .................. 10-2010-0018641

(51) Int. Cl.
*H04B 7/00* (2006.01)

(52) U.S. Cl.
USPC ........... 455/525; 455/524; 455/500; 455/517; 455/561; 455/507; 370/328; 370/329; 370/338; 370/343

(58) Field of Classification Search
USPC ......... 455/525, 524, 517, 500, 507, 508, 509, 455/514, 515, 550.1, 561, 422.1, 403, 455/426.1, 426.2, 445, 432.1, 436–444, 455/434, 435.1–435.3, 461, 462; 370/328, 370/329, 338, 343
See application file for complete search history.

(56) References Cited

U.S. PATENT DOCUMENTS

2003/0114167 A1 6/2003 Chen et al.
2004/0092289 A1 5/2004 Yamada et al.
(Continued)

FOREIGN PATENT DOCUMENTS

KR 10-2004-0085177 10/2004
KR 10-2005-0090469 9/2005
(Continued)

OTHER PUBLICATIONS

International Search Report for Application No. PCT/KR2010/001297, dated Oct. 4, 2010.
Written Opinion for Application No. PCT/KR2010/001297, dated Oct. 4, 2010.

*Primary Examiner* — Keith Ferguson
(74) *Attorney, Agent, or Firm* — Nelson Mullins Riley & Scarborough LLP (57) ABSTRACT

An operation control method in a base station of a wireless communication system includes: checking whether or not an allowed mobile station exists in coverage of the base station and overall coverage of base stations adjacent to the base station; and controlling the base station to perform transmission/reception at a predetermined period through a first discontinuous operation, when the allowed mobile station does not exist in the coverage of the base station and the overall coverage of the adjacent base stations.

7 Claims, 2 Drawing Sheets

(56) References Cited

U.S. PATENT DOCUMENTS

| | | |
|---|---|---|
| 2004/0157610 A1 | 8/2004 | Black et al. |
| 2004/0203991 A1 | 10/2004 | Chen et al. |
| 2007/0026887 A1* | 2/2007 | Voyer et al. ............... 455/525 |
| 2007/0105568 A1 | 5/2007 | Nylander et al. |
| 2007/0165569 A1 | 7/2007 | Kaminski et al. |
| 2008/0056211 A1 | 3/2008 | Kim et al. |
| 2008/0081645 A1 | 4/2008 | Kim et al. |

FOREIGN PATENT DOCUMENTS

| | | |
|---|---|---|
| KR | 10-0568573 | 4/2006 |
| KR | 10-0592899 | 6/2006 |
| KR | 10-0758354 | 9/2007 |
| KR | 1020080030861 | 4/2008 |

* cited by examiner

METHOD AND APPARATUS FOR SUPPORTING DISCONTINUOUS OPERATION OF BASE STATION IN WIRELESS COMMUNICATION SYSTEM AND CONTROL SYSTEM THEREOF

RELATED APPLICATIONS

This application is a 35 U.S.C. §371 national stage filing of PCT Application No. PCT/KR2010/001297 filed on Mar. 2, 2010, which claims priority to, and the benefit of, Korean Patent Application No. 10-2009-0017740 filed Mar. 2, 2009, and Korean Patent Application No. 10-2010-0018641 filed Mar. 2, 2010. The contents of the aforementioned applications are hereby incorporated by reference.

TECHNICAL FIELD

Exemplary embodiments of the present invention relate to a method and apparatus for controlling a base station in a wireless communication system and a control system thereof; and, more particularly, to a method and apparatus for supporting a discontinuous operation of a base station in a wireless communication system and a control system thereof.

BACKGROUND ART

Wireless communication systems which recently have been widely used include a mobile communication system developed on the basis of the circuit communication to provide a voice service, and a wireless packet communication system developed on the basis of on the data communication. The mobile communication system has developed from a type that provides mostly a voice service to a type that supports packet-type data by accepting demands for a packet service, which have advanced since the third-generation (3G) mobile communication system was adopted.

In particular, the packet-type data have a larger variability in data transmission rate than circuit-type data based on the voice. Furthermore, the packet-type data are transmitted at high data transmission rates. Therefore, demand for an effective transmission method of packet-type data is rapidly increasing.

To satisfy such demand, the 3rd Generation Project Partnership (3GPP) which establishes the standards of mobile communication systems has adopted a standard for providing a downlink packet service in High-Speed Downlink Packet Access (HSDPA). Furthermore, Telecommunications Industry Association/Electronic Industries Alliance (TIA/EIA) has adopted a standard for providing a downlink packet service through 1xEV-DO and 1xEV-DV.

In the packet service provided by the mobile communication system, codes and times are allocated as resources to transmit packets. Therefore, traffic variability on a time domain is much larger than in a circuit-mode allocation rule. For example, a large amount of traffic is transmitted while packets are transmitted. However, when packets are not transmitted, traffic may be not generated at all. That is, the voice communication and the packet communication may be compared as follows. In the voice communication, constant resources (codes and times) should be allocated at all times while the communication is performed. In the packet communication, however, a large amount of data to be transmitted may burst in most cases.

Meanwhile, with the development of the mobile communication system, a method for deploying and operating a base station has developed from a conventional method in which a base station is deployed in terms of the coverage of the base station to a method in which a macro base station and a micro base station are combined. That is, the macro base station is deployed to secure coverage, and the micro base station is deployed to expand the coverage and improve transmission efficiency.

To support such a development trend, a Closed Subscriber Group (CSG) base station is defined in the 3GPP Long-Term Evolution (LTE) standard. The CSG base station corresponding to the micro base station is a base station which may be applied to maintain communication in a limited area such as office or basement, which is not included in the coverage of the macro base station, like a repeater. The CSG base station may be divided into an Allowed CSG (hereafter, referred to A-CSG) base station which allows only specific mobile stations to have access and a Non-allowed CSG (hereafter, referred to N-CSG) to which all mobile stations may access. Currently, the A-CSG base station is proposed in a standardization step such that it may be deployed in the coverage of the macro base station so as to be used for indoor service operation.

The micro base station considered in the 3GPP may be roughly divided into three types, that is, a repeater, an N-CSG base station, and an A-CSG base station. The repeater expands the coverage by simply providing transmission and reception. The N-CSG base station not only expands the coverage but also improve transmission efficiency in the entire coverage. The A-CSG base station allows access of only specific mobile stations to distribute a traffic load of the network, thereby improving transmission efficiency. In addition to such a division, other divisions may be applied.

Meanwhile, other mobile communication systems such as Mobile WiMax based on IEEE 802.16 also provide methods for effectively performing communication through the combined base station operation as described above.

Therefore, considering an explosive increase of Access Points (APs) of WiFi, it is expected that the number of micro base stations which are to be deployed afterwards will increase incomparably than the number of macro base stations. For example, it may be assumed that a family registers terminals supporting the 3GPP LTE, such as a notebook computer, a cellular phone, and a PDA to an A-CSG base station and then uses the terminals. In this case, the corresponding A-CSG base station may be deployed at a specific position within an indoor environment. When it is assumed that such a base station is installed in each house in a highly developed city, the number of base stations will explosively increase.

Such micro base stations of which the number will increase explosively may transmit and receive data with smaller power than macro base stations. However, as the number of micro base stations to be deployed increases, the overall power consumption may not only increase, but the power consumption of the micro base station in each indoor environment may also increase. Therefore, a technology development for reducing the power consumption is required for the micro base stations.

As a part of the technology development for reducing the power consumption, methods for providing optimal scheduling and effective power control through a multi-hop relay system or distributed antenna system have been proposed. However, such methods have been developed to reduce power consumption during communication. Therefore, in the communication system of which the traffic variability increases in the time domain, a reduction effect of power consumption is not significant.

As for the conventional method for operating micro base stations as described above, the methods for reducing power used during the communication are reflected. However, predetermined power or more may be unnecessarily consumed even in a section in which communication is not actually performed and which occupies most part of the time domain. Therefore, the reduction effect of power consumption is inevitably limited. Accordingly, there is demand for a method and apparatus for maximizing the reduction effect of power consumption through the effective operation of micro base stations in a state in which the communication is not performed.

DISCLOSURE

Technical Problem

An embodiment of the present invention is directed to a method and apparatus which checks the states of mobile stations allowed to a base station in a wireless communication system and controls an operation of the base station to be performed continuously or discontinuously, thereby reducing power consumption of the base station, and a control system thereof.

Another embodiment of the present invention is directed to a method and apparatus which separately sets the transmission and reception times of a base station in a wireless communication system to a continuous or discontinuous operation, thereby reducing power consumption of the base station, and a control system thereof.

Another embodiment of the present invention is directed to a method and apparatus which sets communication with a upper layer network connected to a base station in a wireless communication system to a continuous or discontinuous operation, thereby reducing power consumption of the base station, and a control system thereof.

Another embodiment of the present invention is directed to a method and apparatus which determines a random access time of a mobile terminal depending on the state of a base station in a wireless communication system to support a continuous or discontinuous operation of the base station, and a control system thereof.

Technical Solution

In accordance with an embodiment of the present invention, an operation control method in a base station of a wireless communication system includes: checking whether or not an allowed mobile station exists in coverage of the base station and overall coverage of base stations adjacent to the base station; and controlling the base station to perform transmission/reception at a predetermined period through a first discontinuous operation, when the allowed mobile station does not exist in the coverage of the base station and the overall coverage of the adjacent base stations.

In accordance with another embodiment of the present invention, operation control apparatus of a base station in a wireless communication system includes: a data processing block configured to transmit/receive data and signals to and from a mobile station; a network processing block configured to process data into another base station and a network connected through a wire; and a control block configured to turn on/off the data processing block at a predetermined period to perform a first discontinuous operation, when an allowed mobile station does not exist in coverage of the base station and overall coverage of base stations adjacent to the base station.

In accordance with another embodiment of the present invention, a wireless communication system for a discontinuous operation of a base station, includes: a mobile station configured to communicate with the base station; a first base station group configured to communicate with the mobile station at all times; and a second base station group configured to communicate with the first base station group through a wired network of a predetermined scheme and perform a first discontinuous operation at a predetermined period when the mobile station does not exist in coverage of the base station and overall coverage of base stations adjacent to the base station.

Advantageous Effects

In accordance with the embodiments of the present invention, when the operation of a base station in a wireless communication system is controlled, the states of mobile terminals allowed to the corresponding base station are checked to perform a continuous or discontinuous operation depending on whether a condition is satisfied or not. Therefore, it is possible to reduce the power consumption of the base station.

Furthermore, the operation of the base station is divided into a function related to the transmission and reception of wireless signals and a function related to the connection with a upper layer network, and separately set the functions to the continuous or discontinuous mode. Therefore, it is possible to significantly reduce the power consumption and stably operate the base station.

BEST MODE

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

When a certain unit "includes" a certain component, it means that the unit may further include another component without excluding another component, as long as the opposite description is not made. Furthermore, a term such as a module described in this specification means one unit which processes a specific function or operation. The module may be implemented by hardware, software, or a combination of hardware and software.

Exemplary embodiments of the present invention which will be described below provide a method and apparatus for supporting a discontinuous operation of a base station in a wireless communication system. More specifically, when controlling an operation of a base station in a communication system, the states of mobile stations allowed to the corresponding base station are checked, and the operation of the base station is continuously or discontinuously performed by using the state information of the mobile stations. Therefore, it is possible to reduce the power consumption of the base station. Furthermore, exemplary embodiments of the present invention provides a method and apparatus which enables an effective operation in terms of power consumption by separately performing a continuous or discontinuous operation of the functions in a base station, which are divided into a transmission function, a reception function, and a function related to the connection with a upper layer network.

Furthermore, when an operation of a mobile station is controlled in the communication system, a random access time is determined depending on the state of a base station in a step in which the mobile station tries random access. Therefore, it is possible to effectively support the discontinuous operation of the base station.

A method for controlling operation continuity of a base station in a communication system in accordance with an embodiment of the present invention includes a step of checking the states of mobile stations, a step of determining the operation continuity of the base station by using the state information of the mobile stations, and a step of setting the operation of the base station such that the base station operates in accordance with the determined operation continuity.

In the step of checking the states of the mobile stations, the states of mobile stations allowed ao the corresponding base station, the states of mobile stations camped on the corresponding base station, and the states of non-allowed mobile stations performing communication are discriminated. As the state information of the allowed mobile stations, identities for discriminating the mobile stations, other information of the mobile stations, or state information about the mobile stations which is inputted from another base station adjacent to the corresponding base station may be used. Furthermore, as the state information of the non-allowed mobile stations, information acquired during the communication with the corresponding mobile stations and information about handover to the corresponding base station which is requested by the non-allowed mobile stations may be received from the adjacent base stations.

In the step of setting the operation of the base station, the operation of the base station may be divided into a function of transmitting wireless signals, a function of receiving wireless signals from mobile stations, and a function of supporting an interface with a network. The operation continuity for the respective functions may be set separately.

When the operation of the base station is set to a discontinuous operation, the inactive duration of the discontinuous operation may be calculated by combining the paging information of the allowed mobile stations and a paging parameter of the base station. The active duration an activation section in the discontinuous operation is an implementation parameter, and a parameter may be selected by considering the operations of the mobile stations and a reduction in power consumption of the base station.

In the step of setting the operation of the base station, the period of the discontinuous operation for the transmission function may be set to the same as that of the discontinuous operation for the reception function, also an activation section of the discontinuous operation for the reception function may have a constant time offset to an activation section of the discontinuous operation for the transmission function.

On the other hand, the period of the discontinuous operation for the reception function in the operation setting of the base station may be different with the period of the discontinuous operation for the transmission function. Furthermore, the operation of the base station may be set in such a manner that base stations receive a response to paging or a random access signal generated at the selected time by a mobile station. Then, it is possible to set a parameter such that the operations of the mobile stations are not changed. For example, the corresponding base station may control the random access times of the allowed mobile stations by using information about available random access times, and may set the period of the discontinuous operation for the reception function in accordance with the available random access times. Furthermore, the period of the discontinuous operation for the transmission function may be set to a multiple ×N of the period of the discontinuous operation for the reception function, where N is a natural number.

The micro base stations may be determined as A-CSG base stations or N-CSG base stations when they are deployed. After the deployment, the micro base stations may be changed to the A-CSG base stations or the N-CSG base stations in consideration of an environmental change such as traffic. The A-CSG base stations having an operational (dis-)continuity of the base stations in accordance with the embodiment of the present invention may be deployed in such a manner that a change may be performed between an A-CGS base station of which the continuous/discontinuous operation modes are switched and an A-CGS base station fixed in the continuous operation mode.

Meanwhile, a method for controlling the operation of a non-connected mobile station in the communication system in accordance with the embodiment of the present invention includes a step of receiving a paging signal and a step of trying random access when paging information corresponding to the mobile station exists.

Furthermore, another method for controlling the operation of the non-connected mobile station in the communication system in accordance with the embodiment of the present invention includes a step of determining a random access time depending on the state of the base station and a step of trying random access at the determined random access time.

In the step of determining the random access time depending on the state of the base station, when the base station is set in the continuous operation mode, the random access time is determined by using necessary information at a point of time at which the random access is requested. Furthermore, when the base station is set in the discontinuous operation mode, the random access time is determined by using necessary information after a point of time at which the reception operation of the base station is activated.

On the other hand, when the base station is set in such a manner that the reception function thereof is activated at all the available random access times, the mobile station may determine a random access time in the same manner as the continuous operation mode of the base station.

Figure 1:
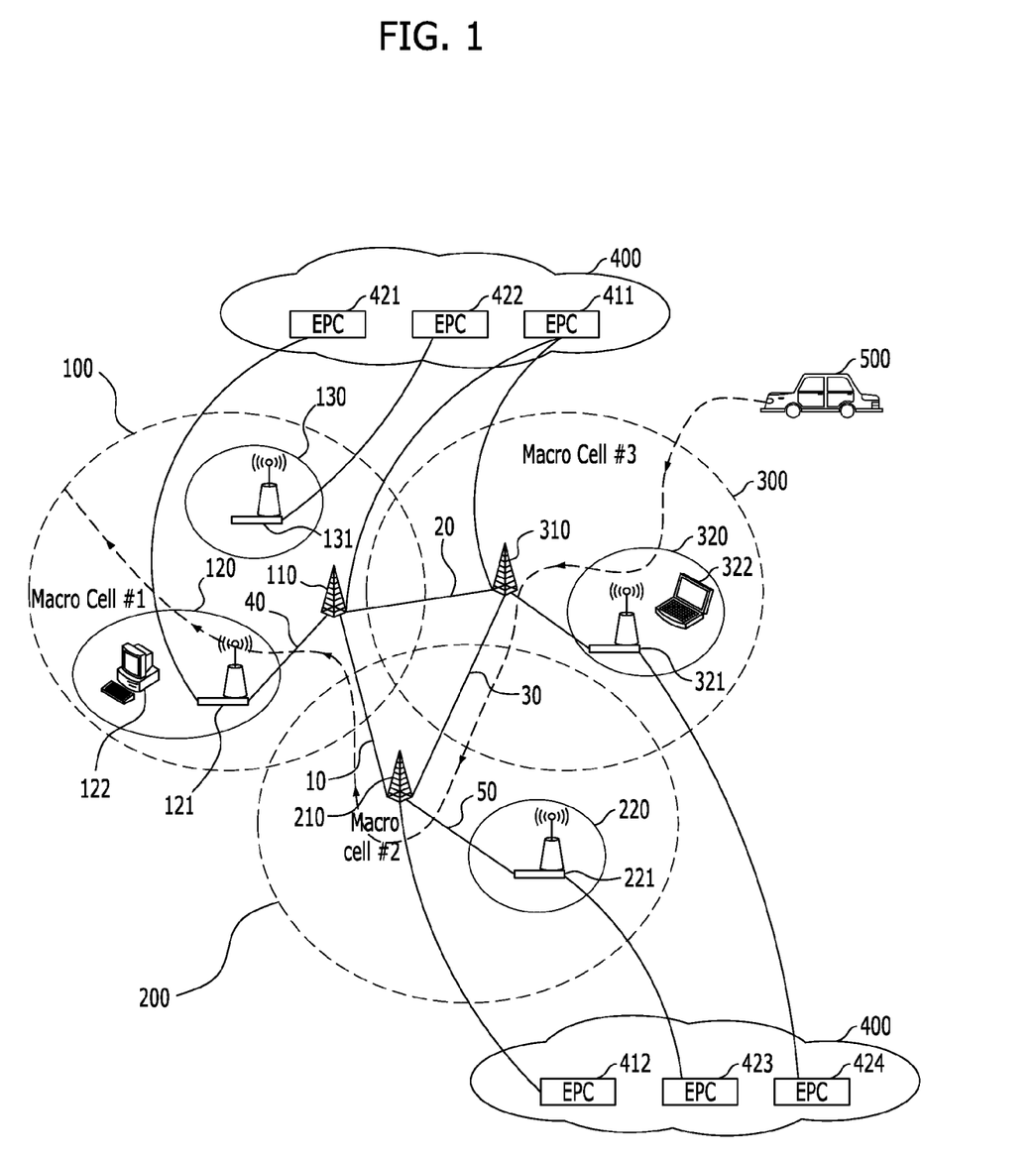
FIG. 1 is a configuration diagram of macro base stations and micro base stations in accordance with an embodiment of the present invention.

FIG. 1 is a configuration diagram of macro base stations and micro base stations in accordance with an embodiment of the present invention. Referring to FIG. 1, the method for controlling a discontinuous operation of the base stations in accordance with the embodiment of the present invention will be described in various cases of the states of mobile stations.

FIG. 1 illustrates three macro base stations 110, 210, and 310 which have a wide coverage, communicating with mobile stations through a wireless channel. The first macro base station 110 has a first macro coverage 100, the second macro base station 210 has a second macro coverage 200, and the third macro base station 310 has a third macro coverage 300. The first to third macro base stations 110 to 310 are adjacent to one another, and have intersection areas for handover of the mobile stations.

There are two different micro base stations 121 and 131 in first macro coverage 100. The first micro base station 121 has a first micro coverage 120, and the second micro base station 131 has a second micro coverage 130. Within the first micro coverage 120 of the first micro base station 121, a first mobile station 122 is positioned. Within the second micro coverage 130 of the second micro base station 131, a mobile station does not exist.

Within the second macro coverage 200 of the second macro base station 210, a third micro base station 221 is positioned. The third micro base station 221 has a third micro coverage 220. Within the third macro coverage 220 of the third macro base station 210 and the third micro coverage 220 of the third micro base station 221, a mobile station does not exist.

Within the third macro coverage 300 of the third macro base station 310, a fourth micro base station 321 is positioned. The fourth micro base station 321 has a fourth micro coverage 320. Within the fourth micro coverage 320 of the fourth micro base station 321, a second mobile station 321 is positioned.

Now, the connections between the respective base stations and a packet network 400 will be described. First, the first macro base station 110 and the third macro base station 310 are connected to each other in a state in which they are shared by a first macro evolved packet core (EPC) 411, and the second macro base station 210 is connected to a second macro EPC 412. The first micro base station 121 is connected to a first micro EPC 421, the second micro base station 131 is connected to a second micro EPC 422, the third micro base station 221 is connected to a third micro EPC 423, and the fourth micro base station 321 is connected to a fourth micro EPC 424. The macro EPCs 411 and 412 and the micro EPCs 421, 422, 423, and 424 are positioned at an end of an IP core network which may communicate with a mobile station or wireless terminal to transmit packets to an IP network.

It is assumed that the respective base stations have the following functions.

First, it is assumed that the first micro base station 121, the second micro base station 131, and the fourth micro base station 321 are set to the A-CSG base stations, and only the third micro base station 221 is set to the N-CSG base station. As described above, the A-CSG base station refers to a base station which allows communication for only specifically allowed mobile stations, and the N-CSG base station refers to a base station which allows communication for all mobile stations.

The third mobile station 500 moves along an arrow direction indicated by a dotted line of FIG. 1. That is, the third mobile station 500 enters the coverage 300 of the third macro base station 310 to move into the coverage 320 of the fourth micro base station 321, and then reenters the coverage 300 of the third macro base station 310 to move into the coverage 200 of the second macro coverage 210. Subsequently, the third mobile station 500 enters the coverage 220 of the third micro base station 221, and then moves into the coverage 100 of the first macro base station 110 from the coverage 200 of the second macro base station 210. After that, the third mobile station 500 passes through the coverage 100 of the first macro base station 110 via the coverage 122 of the second micro base station 121.

In this case, it is assumed that the third mobile station 500 is a mobile station which is allowed in the first micro base station 121. Furthermore, the communication states of each base station aligned with the movement timing of the third mobile station 500 are assumed as follows.

That is, it is assumed that the first mobile station 122 is communicating with the first micro base station 121, the communication between the first mobile station 122 and the first micro base station 121 is then terminated when the third mobile station 500 starts to move, and the first micro base station 121 is converted into the discontinuous operation mode. Furthermore, it is assumed that communication is not performed between the fourth micro base station 421 and the second mobile station 321.

Based on the above-described configurations and assumptions, the operations of each micro base station shown in FIG. 1 will be described.

In the following descriptions, a continuous operation of a micro base station means a continuous operation on a time domain, like an operation of a general base station in accordance with the conventional method. That is, when a micro station performs a transmission function, broadcast signals are transmitted at a predetermined period. Depending on whether transmission is required or not, the micro base station normally transmits the corresponding signals in continuous operation mode. More specifically, when a micro base station performs the continuous operation, a signal broadcast with a reference signal or synchronization signal is transmitted in accordance with the period of the corresponding signal, and signals of which the transmission is additionally requested are transmitted. Furthermore, when a micro base station performs a reception function of the continuous operation, the micro base station may receive a signal regardless of when a mobile station transmits the signal.

Next, a discontinuous operation of a micro base station means a discontinuous operation on a time domain. That is, a base station transmits corresponding signals only at a transmission activation duration in accordance with the period of the discontinuous operation and receives a signal transmitted by a mobile station only at a reception activation duration, different from the operation of the general base station in accordance with the conventional method.

Referring to FIG. 1, the operation of the micro base station in accordance with the embodiment of the present invention will be described.

First, the first micro base station 121 performs the continuous operation because it is communicating with the first mobile station 122. That is, the first micro base station 121 continuously transmits broadcast signals and transmits and receives signals required for the communication with the first mobile station 122. Therefore, the first micro base station 121 performs a normal operation, that is, the continuous operation defined in this embodiment of the present invention, in order for the communication with the existing network 400 during the transmission and reception. As assumed above, the communication between the first mobile station 122 and the first micro base station 121 is terminated immediately before the third mobile station 500 starts to move, and the first micro base station 121 is converted into the discontinuous operation mode.

Meanwhile, since any allowed mobile stations are not positioned in the second micro base station 131 and the first macro base station 110, the second micro base station 131 is in the discontinuous operation mode. That is, the second micro base station 131 discontinuously transmits broadcast signals, and discontinuously receives signals which may be transmitted from mobile stations. However, the operation of the interface with the existing network 400 may be set to the continuous or discontinuous operation depending on the interface type. When the function of the micro base station is further departmentalized, the continuous and discontinuous operations may be selectively applied to the respective functions.

In order for the micro base stations to perform the continuous or discontinuous operation, the following requirements should be provided. The requirements will be described by using the second micro base station 131.

The second micro base station 131 should be able to check that any allowed mobile stations are not included in the second micro coverage 130 and the first macro coverage 100. However, considering that a deactivated mobile station may move, it is not easy for a conventional system to detect the movement of the deactivated mobile station and then inform a micro base station of the detected movement. That is because, when the deactivated mobile station moves from one base station to another base station, the mobile station reselects another base station without delivering a specific message to the one base station, in case where the tracking area identities of the base stations are identical. In other words, although the mobile station is camped on one base station and registered in the corresponding base station, it is difficult to check whether or not the mobile station still exists in the coverage of the corresponding base station after a predetermined time.

Therefore, in order to check whether or not a mobile station allowed at one A-CSG base station is positioned in the corresponding coverage of the A-CSG base station and the neighboring macro coverage, a tracking area identity of the A-CSG base station is set to the same as that of the neighboring macro base station, and set to be different from those of macro base stations outside the neighboring macro base station.

When one mobile station is camped on the second micro coverage 130 of the second micro base station 131 and moves to the first macro coverage 100 of the first macro base station in a state in which the mobile station is deactivated, the tracking area identity of the first macro base station 110 is the same as that of the second micro base station 131. Therefore, the mobile station reselects the first macro base station 110, and does not deliver any message to the first macro base station 110.

Subsequently, when the mobile station moves to the second macro base terminal 210, a tracking area identity broadcast by the second macro base station 210 is different from that of the first macro base station 110 which was the previous macro base station. Therefore, when the mobile station enters the coverage of the second macro base station 210, the mobile station has a random access to the second macro base station 210 because the tracking area identity of the second macro base station 210 is different, and delivers a tracking area identity change message informing that the tracking area identity has been changed. Then, the second macro base station 210 checking the message may check the second micro base station 131 or the first macro base station 110 in which the mobile station was previously positioned, using the tracking area identity delivered by the mobile station. In this embodiment of the present invention, when the tracking area identity change message informing that the tracking area identity has been changed is received from the mobile station, the second macro base station 210 informs the first macro base station 110 or the second micro base station 131 that the mobile station moved to the coverage of the second macro base station 210. At this time, the second macro base station 210 may inform both of the second micro base station 131 and the first macro base station 110 that the mobile station escaped from the coverage 130 of the second micro base station 131 and the coverage 100 of the first macro base station 110. Through such a process, the second micro base station 131 and the first macro base station 110 may check that the corresponding mobile station escaped from the second micro coverage 130 and the first macro coverage 100.

As described above, when the position of the deactivated allowed mobile station can be checked, the discontinuous operation of the base station may be used more effectively. The operation of the base station may be divided into three states depending on the continuity.

<States Depending on Continuity of Base Station>

(1) Deactivation state as a first discontinuous period in which it seems that the period of the discontinuous operation is infinite (2) State as a second discontinuous period which is shorter than the first discontinuous period (3) Continuous operation state in which the period of the discontinuous operation is zero In such a condition that the operation of the base station is divided into three states, the operation state change of the base station will be described as follows.

When an allowed mobile station is not positioned in the corresponding coverage and the neighboring coverage, the base station may operate at the first discontinuous period, that is, in the deactivation state in which it seems that the period of the discontinuous operation is infinite. In another case, when an allowed mobile station is deactivated while positioned in the corresponding coverage and the neighboring coverage, the base station may operate at the second discontinuous period, that is, in the state having a shorter period than the first discontinuous period. In another case, when an activated allowed mobile station is positioned in the corresponding coverage and the neighboring coverage, the base station may operate in the continuous operation state in which the period of the discontinuous operation is zero.

Meanwhile, the discontinuous operation of the base station may be determined without checking whether or not a deactivated allowed mobile station is positioned in the coverage of the base station capable of communicating with the allowed mobile station.

In this case, when the deactivated allowed mobile station is positioned in the corresponding coverage and the neighboring coverage, the discontinuous operation of the base station may be set in such a manner that the period of the discontinuous operation is maintained to a finite value, not zero. When the mobile station is positioned in coverage other than the corresponding coverage and the neighboring coverage, the discontinuous operation of the base station may be set to the deactivation state in which the period of the discontinuous operation seems to be infinite. Then, the discontinuous operation of the base station may be performed without checking whether or not a deactivated allowed mobile station is positioned in the coverage of the base station. That is, when the corresponding base station is set to perform such an operation that the period of the operation is maintained to a finite value, not zero, regardless of the coverage in which the deactivated allowed mobile station is positioned, the position of the deactivated mobile station does not need to be checked.

The above-described operation of the second micro base station 131 may be applied in the same manner, when the third micro base station 221 is an A-CSG base station like the second micro base station 131. However, since the third micro base station 221 is an N-CSG base station, the third mobile station 500 may perform handover to the third micro base station 221.

The not-connected second mobile station 322 is included in the fourth coverage 320 of the fourth base micro station 321. In this case, the fourth micro base station 321 checks that the second mobile station 322 exists in the coverage, by setting a different tracking area identity as described above. Then, the discontinuous operation is selected. In addition, when a deactivated mobile station exists in the corresponding coverage and the neighboring coverage, the operation may be set to the same as the case in which an activated mobile station exists in other coverage. When this method is applied, the operation is identical to the operation of the second micro base station 131.

Meanwhile, the third mobile station 500 is a mobile station allowed in the first micro base station 121, and has a moving path in which the third mobile station 500 moves while performing communication outside overall coverage described above and passes through the first macro coverage 100 via the first micro coverage 120. First, the third mobile station 500 performs handover to the third macro base station 310 while entering the third macro coverage 300.

At this time, when the third macro base station 310 is defined as the neighboring base station of the first micro base station 121, the third macro base station 310 informs the first micro base station 121 that the mobile station allowed in the first micro base station 121 performs the communication in the neighboring base station 310 through the existing network 400. The above-described process is an example of a method for informing the corresponding micro base station of whether an allowed mobile station approaches or not, and various other methods may be applied. The first micro base station 121 checking that the allowed mobile station performs communication in the neighboring base station is set to the continuous operation state, in which the period of the discontinuous operation is zero. However, when the third macro base station 310 is not defined as the neighboring base station of the first micro base station 121, the first micro base station 121 maintains the current state without any changes.

Subsequently, the third mobile station 500 enters the fourth micro coverage 320. At this time, since the third mobile station 500 is a mobile station which is not allowed in the fourth micro base station 321, the third mobile station 500 continuously performs communication in the current third macro base station 310, without performing a separate handover procedure.

When the third mobile station 500 continuously moves to enter the second macro coverage 200, the third mobile station 500 performs handover to the second macro base station 210. In this case, the first micro base station 121 performs the same operation (the continuous mode) as the case in which the third mobile station 500 enters the third macro coverage 300.

Then, when the third mobile station 500 enters the third micro coverage 220, the third mobile station 500 performs a handover procedure to the third micro base station 221, because the third micro base station 221 is an N-CSG base station as described above. After that, when the third mobile station 500 escapes from the third micro coverage 220 to reenter the second macro coverage 200, the third mobile station 500 performs a handover procedure to the second macro base station 210.

When the third mobile station 500 enters the first macro coverage 100, the third mobile station 500 performs a handover procedure to the first macro base station 110. At this point, the first micro base station 121 is necessarily converted into the continuous operation mode. This is because, since the first macro base station 110 is the neighboring base station of the first micro base station 121 as shown in FIG. 1, the first macro base station 110 informs the first micro base station 121 of whether the allowed mobile station approaches or not. Therefore, the third mobile station 500 may normally perform a measurement procedure for handover.

As described above, the neighboring base station of the macro base station including the corresponding micro base station 121 may provide the communication state of the corresponding mobile station. However, when the mobile station performs a handover procedure to the macro base station 110 in which the corresponding micro base station 121 is included, the macro base station may provide the corresponding micro base station 121 with the state of the mobile station. In such a method, the mobile station may normally operate when the measurement for handover may be sufficiently performed because it takes a long time until the handover to the allowed micro base station after the handover to the corresponding macro base station. However, when the allowed micro base station is positioned at the boundary of the corresponding macro base station, the measurement for handover may not be performed well in case where the allowed micro base station discontinuously operates. Therefore, in order to stably operate the mobile station, the neighboring macro base stations as well as the corresponding macro base station need to check the corresponding mobile station and inform the corresponding micro base station of that.

Figure 2:
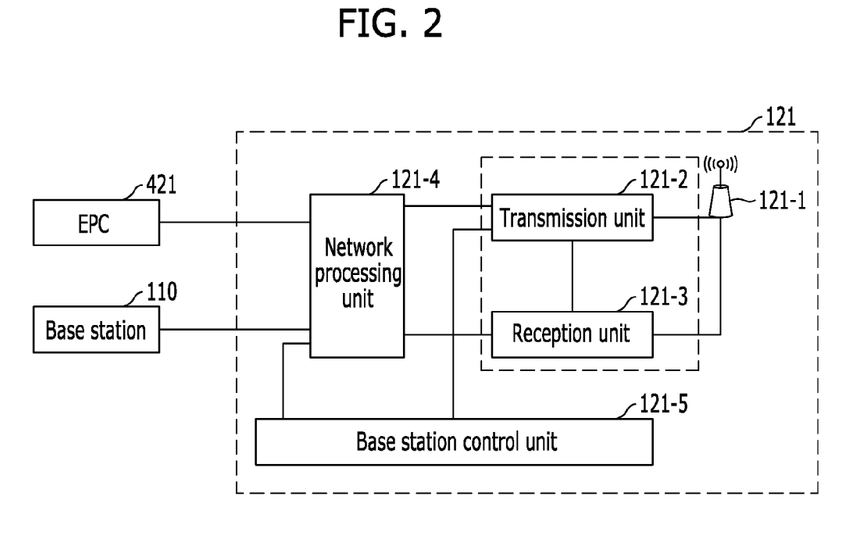
FIG. 2 is an internal block diagram of a micro base station in accordance with an embodiment of the present invention.

FIG. 2 is an internal configuration diagram of a micro base station apparatus in accordance with another embodiment of the present invention. The micro base station apparatus shown in FIG. 2 includes only functions and modules for explaining the embodiment of the present invention. FIG. 2 illustrates the first micro base station 121 among the macro base stations and the micro base stations shown in FIG. 1.

The micro base station apparatus 121 in accordance with the embodiment of the present invention includes an antenna unit 121-1 configured to transmit and receive wireless signals, a transmission unit 121-2 configured to perform downlink transmission, a reception unit 121-3 configured to perform uplink reception, a network processing unit 121-4 configured to control an interface with another base station and connection with an external network, and a control unit 121-5 configured to control the micro base station apparatus.

The network processing unit 121-4 is connected to the first micro EPC 421 providing an interface with the existing network 400 and performs an interface function of the micro base station apparatus 121 with an external network.

The transmission unit 121-2 having a function for downlink transmission receives data, which is to be transmitted, from the network processing unit 121-4 or the base station control unit 121-5, changes the received data such that the data matches the standard of the corresponding wireless communication scheme, and converts the data into a wireless signal to transmit to a wireless environment through the antenna unit 121-1. The transmission unit 121-2 may be implemented by hardware and software, and may include an interface with the reception unit 121-3, if necessary.

The transmission unit 121-2 may perform a discontinuous operation controlled by the base station control unit 121-5. When the discontinuous operation is applied, the entire transmission unit 121-2 may be turned on/off in accordance with the period of the discontinuous operation.

The reception unit 121-3 having a function for uplink reception receives a wireless signal transmitted from a mobile station through the antenna unit 121-1, restores the data in accordance with the standard of the corresponding wireless communication scheme, and transfers the restored data to the network processing unit 121-4 or the base station control unit 121-5. The reception unit 121-3 may be implemented by hardware or software, and may include an interface with the transmission unit 121-2, if necessary.

The reception unit 121-3 may perform a discontinuous operation controlled by the base station control unit 121-5. When the discontinuous operation is applied, the entire reception unit 121-3 may be turned on/off in accordance with the period of the discontinuous operation.

The base station control unit 121-5 performs an overall control operation of the base station apparatus, and in particular, serves to control the discontinuous operation of the base station apparatus in accordance with the embodiment of the present invention. That is, the base station control unit 121-5 controls the operations of the transmission unit 121-2, the reception unit 121-3, and the network processing unit 121-4. Furthermore, the base station control unit 121-5 determines the continuous or discontinuous operation of the micro base station 121 by considering the state of an allowed mobile station, and individually applies the determined operation to the transmission unit 121-2, the reception unit 121-3, and the network processing unit 121-4. In order to apply the continuous or discontinuous operation as described above, the base station control unit 121-5 may generate an independent control signal to control the respective function blocks. Furthermore, the base station control unit 121-5 may provide only information about the operation state, and the transmission unit 121-2, the reception unit 121-3, and the network processing unit 121-4 may individually generate a control signal to turn on/off the respective function blocks.

The base station control unit 121-5 shown in FIG. 2 also performs an overall control in the conventional base station. Therefore, in order to add the function of supporting the continuous or discontinuous operation to the conventional base station, the base station control unit 121-5 may be set to perform the control operation of the conventional base station and additionally perform the function of supporting the continuous or discontinuous operation of the micro base station in accordance with the embodiment of the present invention. Through the setting, one control operation of the conventional base station may be applied to the macro base station which performs the continuous operation at all times and the micro base station which selectively performs the continuous and discontinuous operations. Even when a micro base station deployed in a condition in which the continuous or discontinuous operation is not supported is upgraded, the function of controlling the discontinuous operation may be added module-by-module.

The transmission unit 121-2 and the reception unit 121-3 may be referred to as a data processing block indicated by a dotted line of FIG. 2. The data processing block may process data depending on a standard requested by a wireless communication system and transmit/receive the data through a standard depending on the requirements of the corresponding wireless communication system.

Figure 3:
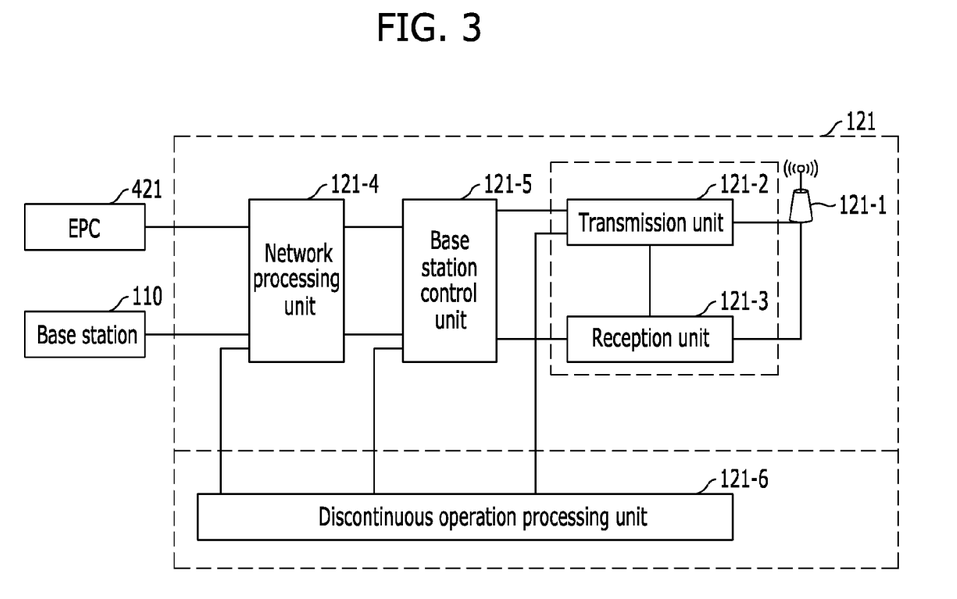
FIG. 3 is an internal block diagram of a micro base station in accordance with another embodiment of the present invention.

FIG. 3 is a function block diagram of a micro base station apparatus in accordance with another embodiment of the present invention.

Hereafter, the control operation for the continuous and discontinuous operations of the first micro base station 121, the second micro base station 131, the third micro base station 221, and the fourth micro base station 321 will be described on the basis of the base station function block shown in FIG. 3. In FIG. 3, the first micro base station 121 is taken as an example, and the configuration and operation of the micro base station apparatus may be commonly applied to all the micro base stations.

All the function blocks of the first micro base station 121 perform the continuous operation, because the first mobile station 122 performs communication in the activation state.

Meanwhile, the second micro base station 131 performs the discontinuous operation, because a mobile station does not exist in the corresponding coverage. Therefore, a discontinuous operation control unit 131-6 sets a transmission unit 131-2 and a reception unit 131-3 to perform the discontinuous operation at an independent period. On the other hand, a base station control unit 131-5 and a network processing unit 131-4 may not perform the discontinuous operation to process signals inputted from an external network and another base station. In this case, however, the traffic to be processed and the amount of functions to be performed are significantly reduced in comparison with when the continuous operation is performed. Therefore, the discontinuous operation is supported at a much smaller processing capability by a method of reducing a clock speed or the like, which makes it possible to reduce power consumption.

Since the third micro base station 221 is an N-CSG base station, the third micro base station 221 is set to perform the continuous operation at all times, like the macro base station.

The fourth micro base station 321 is an A-CSG base station. Since the second mobile station 322 is deactivated, the fourth micro base station 321 is in the discontinuous operation mode.

The third mobile station 500 shown in FIG. 1 is a mobile station allowed in the first micro base station 121, and has a moving path in which the third mobile station 500 moves while performing communication outside overall coverage described above and passes through the first macro coverage 100 via the first micro coverage 120. First, while entering the third macro coverage 300, the third mobile station 500 performs handover to the third macro base station 310. At this time, the third macro base station 310 informs the first micro base station 121 that the mobile station allowed in the first micro base station 121 communicates in the neighboring base station through the existing network 400. At this time, the network processing unit 121-4 of the first micro base station 121 in the discontinuous operation mode, which is operating at a reduced processing speed, receives the information and transfers the corresponding information to the discontinuous operation processing unit 121-6. Subsequently, the discontinuous operation processing unit 121-6 changes the processing speed of the network processing unit 121-4 and the base station control unit 121-5 to a normal state, and converts the transmission unit 121-2 and the reception unit 121-3 to the continuous operation mode.

Then, the third mobile station 500 enters the fourth micro coverage 320. At this time, since the corresponding mobile station is a mobile station which is not allowed in the fourth micro base station 321, the fourth micro base station 321 maintains the discontinuous operation mode.

The transmission unit 131-2 and the reception unit 131-3 may be also referred to as a data processing block indicated by a dotted line of FIG. 3. The data processing block may perform a procedure for data processing and wireless communication in accordance with the standard of the wireless communication system.

While the present invention has been described with respect to the specific embodiments, it will be apparent to those skilled in the art that various changes and modifications may be made without departing from the spirit and scope of the invention as defined in the following claims.

The invention claimed is:

1. An operation method of a first base station, comprising:
checking whether or not an allowed mobile station exists in coverage of the first base station and coverage of a second base station adjacent to the first base station; and
discontinuously operating with a first period, if the allowed mobile station does not exist in the coverage of the first base station and the coverage of the second base station.

2. The operation method of claim 1, further comprising changing the first base station into an active state, if entry of the allowed mobile station to the coverage of the first base station is checked or camping information of the allowed mobile station is received from the second base station.

3. The operation method of claim 2, wherein the entry of the allowed mobile station to the coverage of the first base station is checked by using handover request information transmitted to the second base station from the allowed mobile station.

4. The operation method of claim 1, further comprising:
discontinuously operating with a second period having lager on/off rate than on/off rate of the first period, if the allowed mobile station in a deactivated state enters to the coverage of the second base station.

5. The operation method of claim 1, wherein a tracking area identity of the first base station is same as a tracking area identity of the second base station.

6. A base station comprising:
a data processing unit configured to transmit/receive data or signals to and from a mobile station;
a network processing unit configured to process data into a network; and
a control unit configured to discontinuously operate the data processing unit with a predetermined period, if an allowed mobile station does not exist in coverage of the base station and coverage of an adjacent base station adjacent to the base station.

7. The base station of claim 6, wherein the control unit changes the data processing unit into an activate state, if camping information of the allowed mobile station is received from the adjacent base station through the network processing unit.

* * * * *